(12) United States Patent  (10) Patent No.: US 8,693,152 B2
Tuen et al.  (45) Date of Patent: Apr. 8, 2014

(54) POWER OVER ETHERNET POWERED DEVICE CIRCUIT AND ELECTROSTATIC DISCHARGE PROTECTION CIRCUIT THEREOF

(75) Inventors: Lung-Fai Tuen, New Taipei (TW); Shan-Hung Wang, New Taipei (TW); Chiu-Hsien Chang, New Taipei (TW)

(73) Assignee: Wistron Corp., New Taipei (TW)

( * ) Notice: Subject to any disclaimer, the term of this patent is extended or adjusted under 35 U.S.C. 154(b) by 3 days.

(21) Appl. No.: 13/481,976

(22) Filed: May 29, 2012

(65) Prior Publication Data

US 2013/0031383 A1 Jan. 31, 2013

(30) Foreign Application Priority Data

Jul. 25, 2011 (TW) .............................. 100126217 A

(51) Int. Cl.
 *H02H 3/22* (2006.01)
 *H02H 9/00* (2006.01)
 *H02H 9/04* (2006.01)

(52) U.S. Cl.
 CPC . *H02H 9/00* (2013.01); *H02H 9/04* (2013.01); *H02H 9/046* (2013.01)
 USPC ............................................ 361/56; 361/111

(58) Field of Classification Search
 USPC ........................................ 361/56, 111, 91.1
 See application file for complete search history.

(56) References Cited

U.S. PATENT DOCUMENTS 7,679,878 B2* 3/2010 Maggiolino ................... 361/119
2008/0198635 A1* 8/2008 Hussain et al. ............. 363/21.11

* cited by examiner

*Primary Examiner* — Danny Nguyen
(74) *Attorney, Agent, or Firm* — Li & Cai Intellectual Property (USA) Office

(57) ABSTRACT

A Power over Ethernet (PoE) Power Device (PD) circuit and a protection circuit of electrostatic discharge (ESD) thereof are provided. The protection circuit of ESD includes a transient voltage suppressor (TVS) and a high-voltage capacitor, wherein the TVS and the high-voltage capacitor are coupled in series between a negative power terminal and a grounding terminal to reduce system malfunctions or damages when ESD or transient voltage surge occurs.

13 Claims, 5 Drawing Sheets

POWER OVER ETHERNET POWERED DEVICE CIRCUIT AND ELECTROSTATIC DISCHARGE PROTECTION CIRCUIT THEREOF

BACKGROUND OF THE INVENTION

1. Field of the Invention

The instant disclosure relates to a protection circuit of electrostatic discharge (ESD); particularly to a protection circuit of ESD utilized in the Powered Device (PD) of the Power over Ethernet (PoE) system.

2. Description of Related Art

The PoE is generally directed to a system that is capable of transmitting electrical power along with data on Ethernet. And the system generally includes the Power Sourcing Equipment (PSE) and the PD. This technology is especially useful for powering IP telephones, wireless LAN access points, web cameras, hubs, computers and so on, wherein these devices can be supplied with power solely through the twisted pair cable (RJ-45 connector) of the Ethernet, without relying on external power supplies.

Devices adopting the technology of PoE enable electricity and data to transmit through the RJ-45 internet plugs, and as the RJ-45 internet plugs are widely used throughout the modern world, it is contemplated that approximately all the PoE devices are compatible with the current internet environment. Furthermore, the PoE system can supply and cut-off power remotely without the need of changing the Ethernet cable structures, preserving vast amount of resource associated with the power cords.

Furthermore, since the PoE system may suffers damages from the ESD such damages may be minimized when the physical layer receiver of the Ethernet is properly protected. Generally, the protection is implemented within the PoE chip and thus is incapable of providing the system-level ESD protection. Therefore, in order to remain compatible with multiple standards and to ensure the dependability of the system, an extremely fast Schottky diode is used to guide the current into the ground to prevent system from being damaged due to ESD.

SUMMARY OF THE INVENTION

The object of the instant disclosure is to provide a Power over Ethernet Powered Device circuit (PoE PD circuit) and a protection circuit of electrostatic discharge (ESD), wherein the protection circuit of ESD includes a transient voltage suppressor (TVS) and a high-voltage capacitor coupled in series to efficiently reduce the damages or false actions of the PoE devices when ESD or transient voltage surges occurs.

The instant disclosure provides a protection circuit of ESD of a PoE PD circuit, wherein the PoE PD circuit is arranged in a PD, and the PoE PD circuit includes a control unit having a positive power terminal and a negative power terminal. The protection circuit of ESD includes a Transient Voltage Suppressor (TVS) and a high-voltage capacitor, wherein the TVS has a first end and a second end, wherein the first end is coupled to the negative power terminal, while the high-voltage capacitor is coupled between the second end of the TVS and the grounding terminal.

In another embodiment of the instant disclosure, the protection circuit of ESD can also be applied on a positive power terminal to reduce the damages when ESD occurs in the positive power terminal. Furthermore, based on the requirements of the circuit design, the protection circuit of ESD can also be applied on the positive and the negative power terminals simultaneously to reduce the damages when ESD occurs in the positive and the negative power terminals.

On the other hand, the instant disclosure provides a PoE PD circuit having the protection circuit of ESD, wherein the protection circuit of ESD can be arranged on the negative and the positive power terminal of the PoE PD circuit respectively or simultaneously to reduce the damages when ESD occurs.

In conclusion, the instant disclosure utilizes the TVS and the high-voltage capacitor which are coupled in series to serve as the protection circuit of ESD, such that the system false actions and damages when ESD occurs can be efficiently reduced.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The First Embodiment

Figure 1:
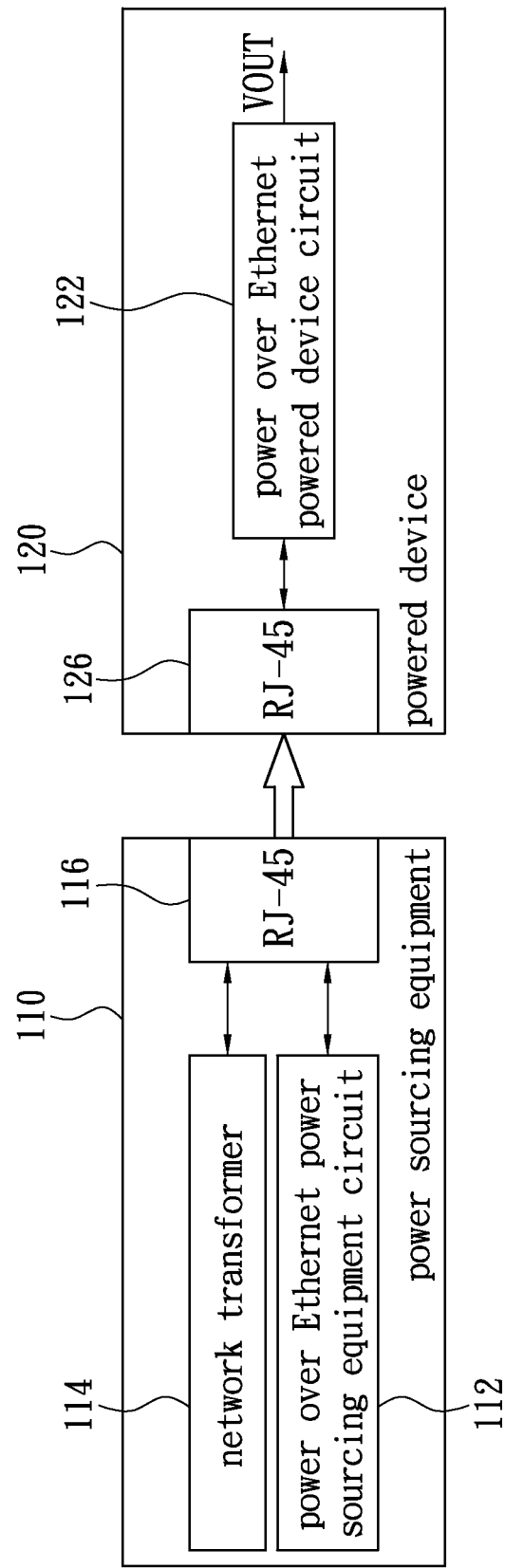
FIG. 1 shows a perspective view of the Power over Ethernet (PoE) system according to the first embodiment of the instant disclosure.

With reference to FIG. 1 which illustrates a perspective view of a Power over Ethernet (PoE) system according to the first embodiment of the instant disclosure. Electrical power can be transferred safely along with data on an Ethernet cabling from a Power Sourcing Equipment (PSE) 110 to a Powered Device (PD) 120, wherein the PSE 110 and the PD 120 can be inter-connected through a RJ-45 connector and a twisted pair cable (internet cable). The PoE may include two powering modules A and B, wherein the module A utilizes the pins 1, 2, 3, and 6 of the RJ-45 connector to transmit the electrical power, while the module B utilizes the pins 4, 5, 7, and 8 of the RJ-45 connector to transmit the electrical power.

The PSE 110 includes a Power over Ethernet Power Sourcing Equipment (PoE PSE) circuit 112 and a network transformer 114 to transmit the electrical power along with the data to the RJ-45 connector 116. The powered device 120 includes a PoE PD circuit 122 to receive the electrical power and the data through the RJ-45 connector 126. The received electrical power is converted into a direct current (DC) output voltage VOUT for powering the PD 120. The RJ-45 connector 116 and the RJ-45 connector 126 may be inter-connected through an internet cable.

Figure 2:
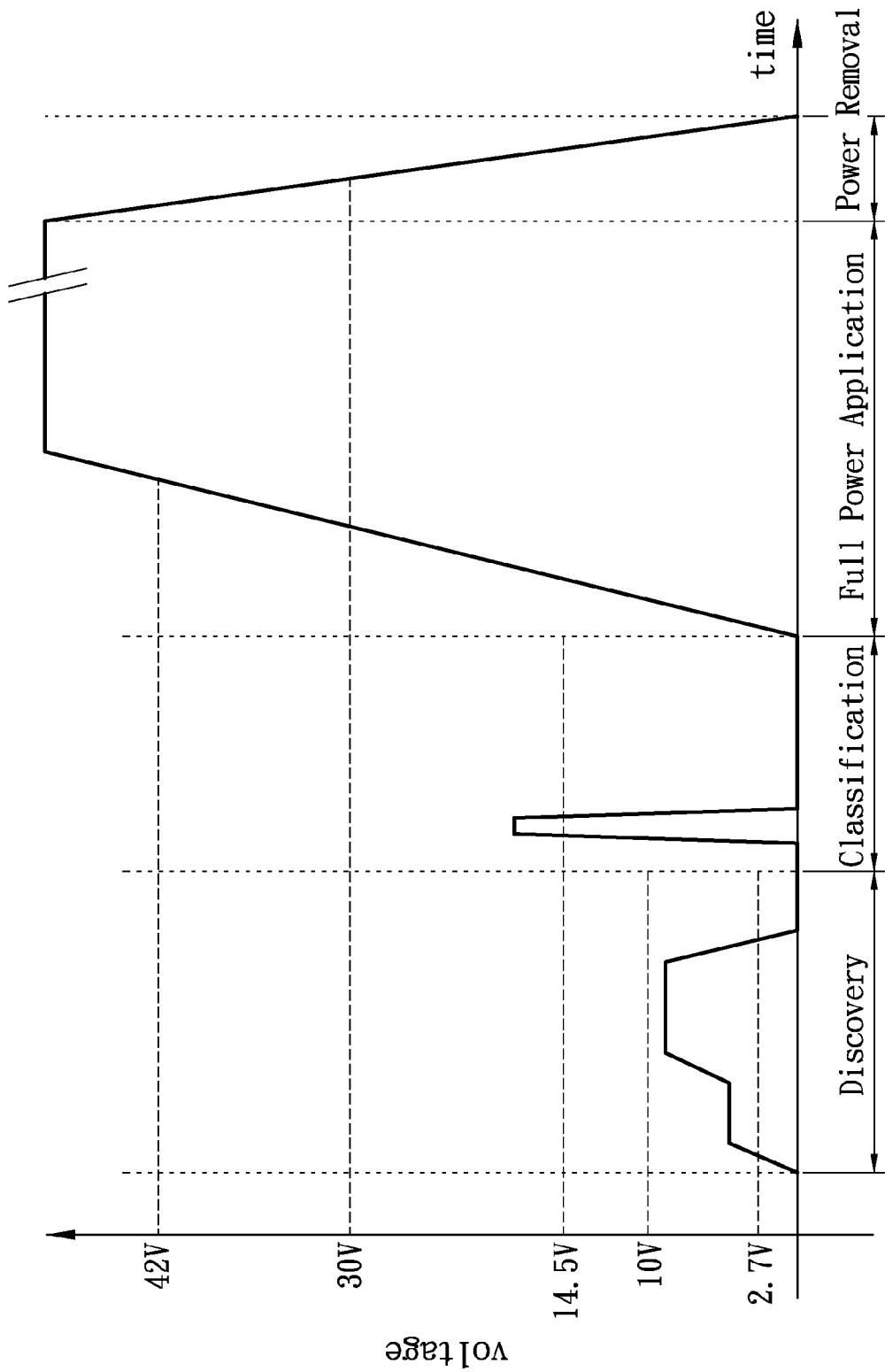
FIG. 2 shows a perspective view of the beginning signals of the PoE operational module according of the instant disclosure.

According to IEEE 802.3af standard, when the PD 120 is connected to the PSE 110 the PSE 110 may be configured to transmit voltage waveforms of several procedures sequentially to the PD 120 to determine whether the PD 120 supports the PoE system. As shown in FIG. 2 which illustrates a perspective view of initiating signals of operation modes of the PoE. The aforementioned procedures include among others Discovery, Classification, Full Power Application, and Power Removal. As the voltage provided by the PSE 110 may damage the conventional equipment, the PSE 110 may begin the procedure of Discovery before powering the equipment by transmitting a discovering voltage which ranges from 2.7V to 10V to the PD 120, in order to determine whether the PD 120 is supportive of the PoE technology. Referring to FIG. 2, as the waveform of the Electrostatic Discharge (ESD) may be similar to the waveform of the discovering voltage in FIG. 2 the PD 120 may malfunction, or even be damaged as the result. As such, a protection circuit of ESD is arranged in the PD 120 according to the instant disclosure to prevent the PD 120 from being damaged by transient voltages arising out of ESD, cable discharges or transient voltage surges.

Figure 3:
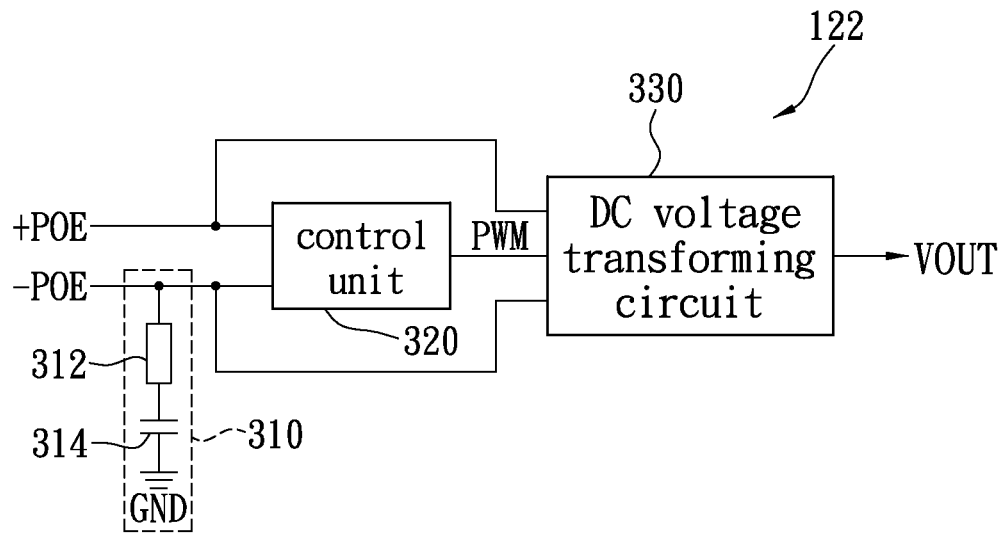
FIG. 3 shows a perspective view of the protection circuit of ESD of the PoE Powered Device (PD) circuit according to the first embodiment of the instant disclosure.

Referring now to FIG. 3 which shows a perspective view of the protection circuit of ESD of the PoE PD circuit according to the first embodiment of the instant disclosure. The PoE PD circuit 122 includes a protection circuit of ESD 310, a control unit 320 and a DC voltage transforming circuit 330. The control unit 320 includes a positive power terminal (+POE) and a negative power terminal (−POE). The two terminals (+POE and −POE) are utilized to receive positive and negative POE powers, respectively. The positive power may be referred to as the positive voltage transmitted from the pins 4 and 5 of the RJ-45 connector 126, while the negative POE may be the negative voltage transmitted from the pins 7 and 8 of the RJ-45 connector 126. The DC voltage transforming circuit 330 receives the positive and negative voltages from the positive power terminal (+POE) and the negative power terminal (−POE), respectively, and is coupled to the control unit 320 to receive a Pulse Width Modulated (PWM) signal outputted from the control unit 320. The DC voltage transforming circuit 330 may adjust the magnitude of the output voltage VOUT depending on the duty cycle of the PWM signal.

The protection circuit of ESD 310 is coupled to the negative power terminal (−POE) of the control unit 320 to prevent the ESD from damaging the control unit 320. The protection circuit of ESD 310 includes a Transient Voltage Suppressor (TVS) 312 and a capacitor 314. The capacitance of the capacitor 314 is greater than the equivalent capacitance (the internal parasitic capacitance) of the TVS 312. In one implementation, the capacitance of the capacitor 314 is greater than 1000 pico-farads (pF). The first end of the TVS 312 is coupled to the negative power terminal (−POE), while the second end is coupled to the capacitor 314. The TVS 312 and the capacitor 314 are coupled in series between the negative power terminal (−POE) and a ground terminal GND.

The TVS 312 is a device that may respond to the transient voltage. When the ESD or the transient voltage surge is present, the TVS 312 will be conducted by the transient voltage, allowing for the transient current to be guided into the ground as opposed to flowing into the control unit 320 which may further damage the control unit 320. In general, conventional TVS 312 may be implemented in terms of a Zener diode, a TVS diode, a Metal Oxide Varistor (MOV), a Multi-Layer Varistor (MLU), a Ceramic Layer, or a combination thereof The voltage-current characteristic of the TVS 312 is shown in FIG. 4.

Figure 4:
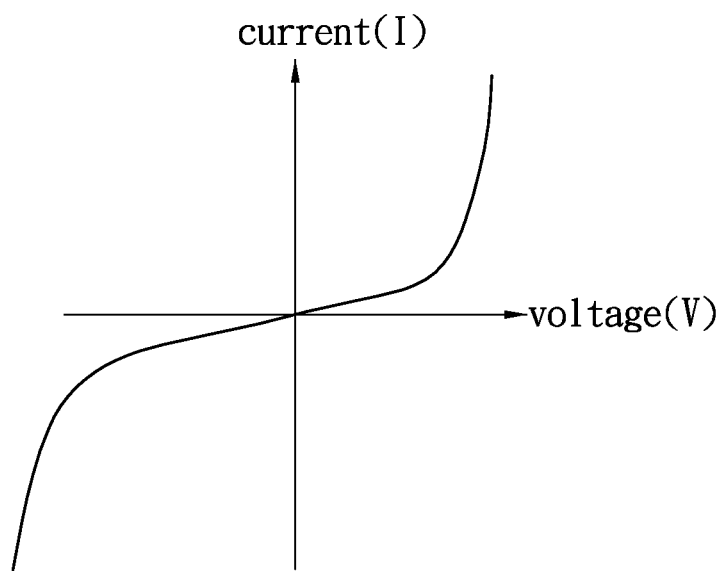
FIG. 4 shows a perspective view of the voltage-current characteristic of the transient voltage suppressor according of the instant disclosure.

According to FIG. 4, when the voltage of the two ends of the TVS 312 exceeds the threshold the resistance of the TVS 312 will decrease dramatically (for instance, from over $10^9$ ohm to only a few ohm), such that the current will be guided to pass through the TYS 312 instead of flowing into the system. In other words, the TVS 312 will be short-circuited due to the transient high-voltage (such as the ESD) in order to protect the system.

Referring again to FIG. 3, in the instant embodiment, the TVS 312 is coupled to the ground terminal GND through the capacitor 314 instead of being directly coupled to the ground terminal (GND). The capacitor 314 in one implementation may be a high-voltage capacitor having the capability of enduring the large voltage level associated with the ESD or the transient voltage surges. The capacitor 314 is also capable of filtering and regulating the voltage and is coupled directly between the TVS 312 and the ground terminal (GND). In order to avoid deterioration on the part of the initiating signals shown in FIG. 2 due to being electrically coupled to the capacitor 314 in series, the TVS 312 may cause the voltage associated with the ESD to be grounded to prevent damages to electrical components.

Figure 5:
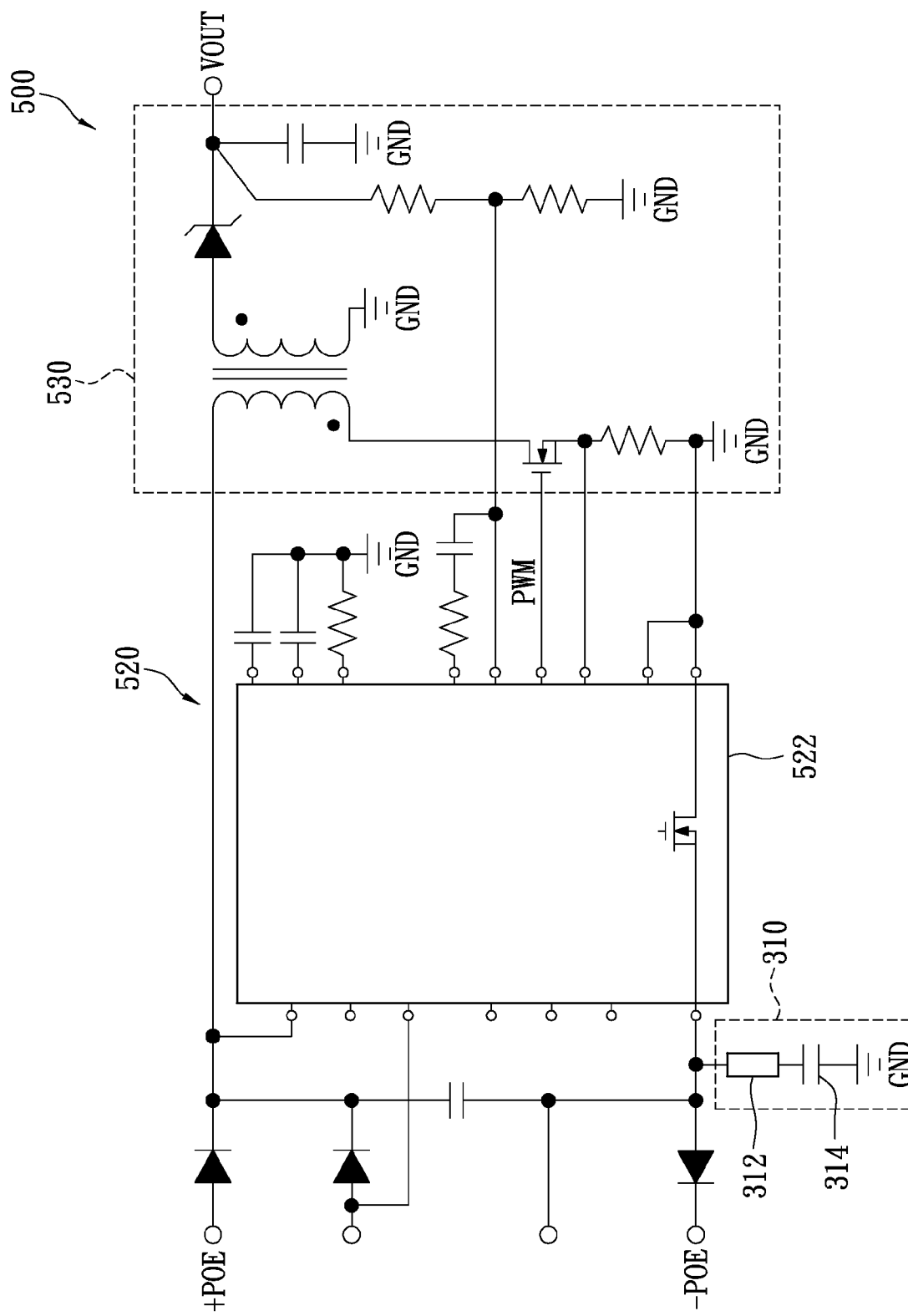
FIG. 5 shows a perspective view of the detail circuit layout of the PoE PD circuit according to the first embodiment of the instant disclosure.

Referring now to FIG. 5 which shows a perspective view of the detail circuit layout of the PoE PD circuit according to the first embodiment of the instant disclosure. The PoE PD circuit 500 utilizes a PoE powered chip 522 to implement a control unit 520. The positive power terminal (+POE) and the negative power terminal (−POE) of the POE powered chips 522 are connected with the positive and negative POE powers, respectively. The circuit of the DC voltage transforming circuit 530 may be implemented in terms of a fly-back transforming circuit, and may adjust the output voltage VOUT based on the PWM signal outputted by the POE powered chip 522. The protection circuit of ESD 310 is coupled between the negative power terminal (−POE) and the ground terminal (GND) to prevent the ESD and the transient voltage surges from negatively influencing the operation of the PoE powered chip 522. The main difference between the FIGS. 3 and 5 lies in the implementation details of the circuitry, wherein the implementation details other than the protection circuit of ESD 310 can refer to the instruction manual of the PoE chip for better understanding.

The Second Embodiment

Figure 6:
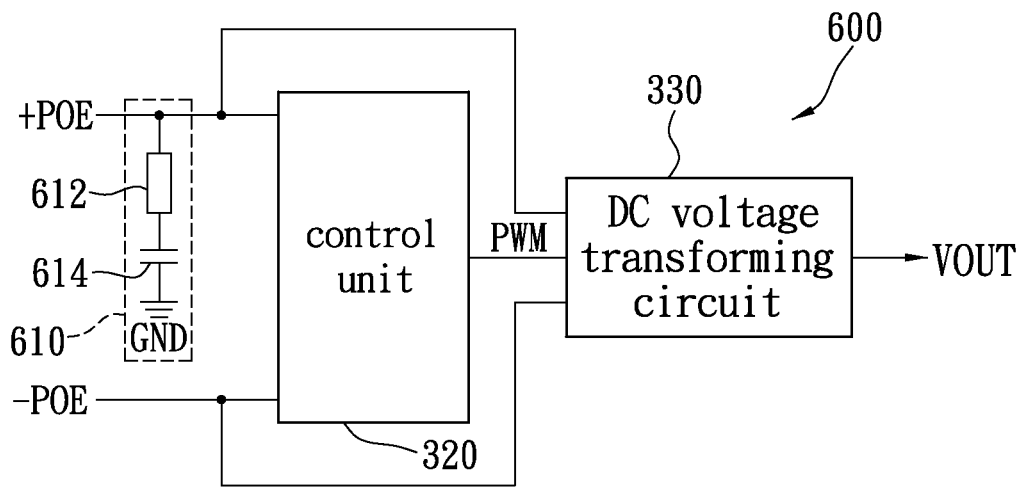
FIG. 6 shows a perspective view of the circuit diagram of the PoE PD circuit according to the second embodiment of the instant disclosure.

The protection circuit of ESD 310 of the FIG. 3 is applicable to the positive terminal (+POE) to prevent the damages to the control unit 320 when the ESD or the transient voltage surge occurs in the positive power terminal (+POE). Please refer to FIG. 6 which shows a perspective view of the circuit diagram of the PoE PD circuit according to the second embodiment of the instant disclosure. The PoE PD circuit 600 includes a protection circuit of ESD 610, a control unit 320, and a DC voltage transforming circuit 330. The protection circuit of ESD 610 may be implemented by having the TVS 612 and the capacitor 614 coupled in series. The protection circuit of ESD 610 is coupled between the positive power terminal (+POE) and the ground terminal (GND), and the capacitor 614 may be a high-voltage capacitor in one implementation. The protection circuit of ESD 610 is capable of guiding the transient current into the ground terminal (GND)

to effectively reduce the damages and the false actions of the chip when the ESD or the transient voltage surge occurs in the positive power terminal (+POE).

The Third Embodiment

Figure 7:
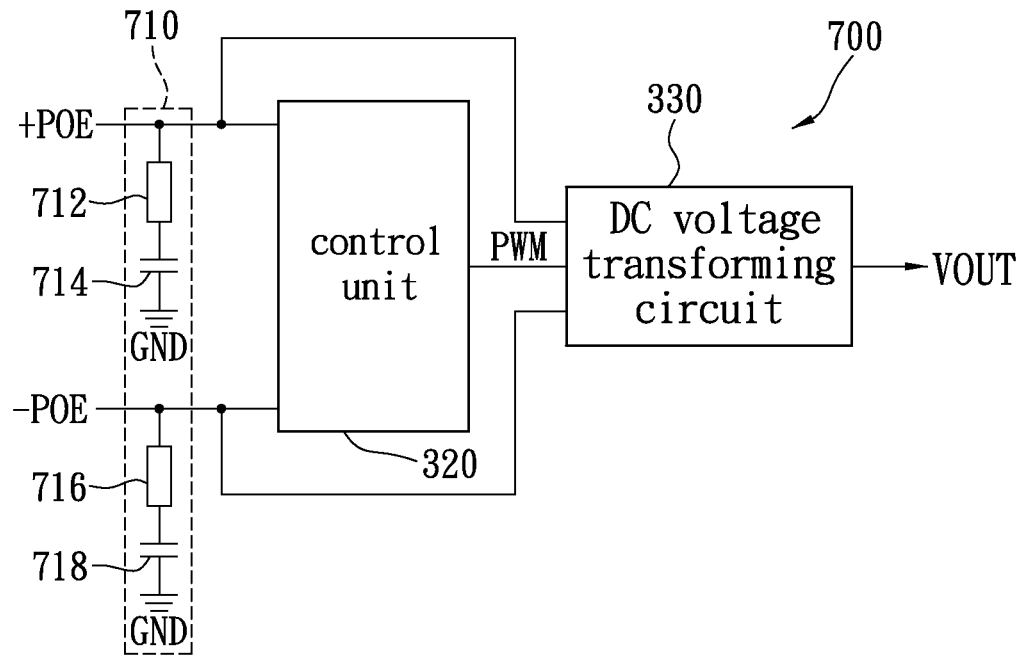
FIG. 7 shows a perspective view of the circuit diagram of the PoE PD circuit according to the third embodiment of the instant disclosure.

The protection circuit of ESD 310 of the FIG. 3 is applicable to both the positive power terminal (+POE) and the negative power terminal (−POE) simultaneously to prevent the damages to the control unit 320 when the ESD or the transient voltage surge occurs in the positive power terminal +POE. Please refer to FIG. 7 which shows a perspective view of the circuit diagram of the POE PD circuit according to the third embodiment of the instant disclosure. The PoE PD circuit 700 includes a protection circuit of ESD 710, a control unit 320 and a DC voltage transforming circuit 330.

The protection circuit of ESD 710 includes TVS 712 and 716 and capacitors 714 and 718. In one implementation, the capacitors 714 and 718 may be high-voltage capacitors. The TVS 712 and the capacitor 714 are coupled in series between the positive power terminal (+POE) and the ground terminal (GND), while the TVS 716 and the capacitor 718 are coupled in series between the negative power terminal (−POE) and the ground terminal (GND). Thus, the ESD protection circuit 710 may effectively reduce the chip damages and the false actions of the chip when the ESD or the transient voltage surge occur in the positive power terminal (+POE) or the negative power terminal (−POE).

The protection circuits of ESD 310, 610, and 710 of the aforementioned embodiments may effectively prevent the voltage discharge waveforms generated by the ESD from entering the control unit 320. The aforementioned protection circuits of ESD 310, 610, and 710 may be incorporated into the PoE electrical devices such as the routers, scanners, desktop computers and signal cables with power depending on the design requirements and the cost.

Furthermore, the POE PD circuits 310, 610, and 710 can utilize modules, chips or discrete elements to implement, in forms of independent modules or integrally formed on the system circuit board.

In addition, the coupling relationship of the aforementioned components includes direct or indirect electrical connections.

In conclusion, the protection circuit of ESD can be applied on PoE PD circuit to prevent the system false actions or damages when the ESD or the transient voltage occurs. In addition, the structural design of the protection circuit of ESD in the instant disclosure is simplified, and also, the effect of reducing and preventing the ESD can be achieved by utilizing a simple constructed layout, while the protection circuit of ESD can be instantly integrated to any kind of PoE electrical devices to reduce both the implementation cost and the utilized circuit space, wherein the technical means of the instant disclosure can also increase the stability and sensitivity of the signal quality dramatically.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A protection circuit of electrostatic discharge (ESD) of a Power over Ethernet (PoE) Powered Device (PD) circuit, wherein the Power over Ethernet Powered Device circuit comprises a control unit which includes a positive power terminal and a negative power terminal, wherein the electrostatic discharge protection circuit comprises:
    a first transient voltage suppressor (TVS) having a first end and a second end, wherein the first end of the transient voltage suppressor is coupled to the negative power terminal; and
    a first high-voltage capacitor coupled between the second end of the first transient voltage suppressor and a ground terminal.

2. The Power over Ethernet Powered Device circuit according to claim 1, further comprising a direct current (DC) voltage transforming circuit coupled to the control unit, wherein an output voltage is adjusted based on a pulse width modulation (PWM) signal outputted by the control unit.

3. The protection circuit of electrostatic discharge of the Power over Ethernet Powered Device circuit, according to claim 1, wherein a capacitance of the first high-voltage capacitor is greater than a component capacitance of the first transient voltage suppressor.

4. The protection circuit of electrostatic discharge of the Power over Ethernet Powered Device circuit, according to claim 1, wherein the positive power terminal of the control unit is utilized to receive a direct voltage of 48 volts, while the negative power terminal is utilized to receive a direct voltage of minus 48 volts.

5. The protection circuit of electrostatic discharge of the Power over Ethernet Powered Device circuit, according to claim 1, wherein the first transient voltage suppressor and the first high-voltage capacitor are coupled directly between the negative power terminal and the ground terminal.

6. The protection circuit of electrostatic discharge of the Power over Ethernet Powered Device circuit according to claim 1, further comprising:
    a second transient voltage suppressor having a first end and a second end, wherein the first end of the second transient voltage suppressor is coupled to the positive power terminal; and
    a second high-voltage capacitor coupled between the second end of the second transient voltage suppressor and a ground terminal.

7. A protection circuit of electrostatic discharge of a Power over Ethernet Powered Device circuit applicable to a Powered Device, wherein the Power over Ethernet Powered Device circuit comprises a control unit, wherein the control unit includes a positive power terminal and a negative power terminal, wherein the protection circuit of electrostatic discharge comprises:
    a transient voltage suppressor having a first end and a second end, wherein the first end of the transient voltage suppressor is coupled to the positive power terminal; and
    a high-voltage capacitor coupled between the second end of the transient voltage suppressor and a ground terminal.

8. The protection circuit of electrostatic discharge of the Power over Ethernet Powered Device circuit, according to claim 7, wherein a capacitance of the high-voltage capacitor is greater than a component capacitance of the transient voltage suppressor.

9. A Power over Ethernet Powered Device circuit applicable on a Powered Device, comprising:
    a control unit having a positive power terminal and a negative power terminal;
    a direct current voltage transforming circuit coupled to the control unit, wherein an output voltage is adjusted based on a pulse width modulation signal outputted by the control unit; and a protection circuit of electrostatic discharge which comprises:
  a first transient voltage suppressor having a first end and a second end, wherein the first end of the first transient voltage suppressor is coupled to the negative power terminal; and
  a first high-voltage capacitor coupled between the second end of the first transient voltage suppressor and a ground terminal.

10. The Power over Ethernet Powered Device circuit according to claim 9, wherein a capacitance of the first high-voltage capacitor is greater than a component capacitance of the first transient voltage suppressor.

11. The Power over Ethernet Powered Device circuit according to claim 9, wherein the protection circuit of electrostatic discharge further comprises:
  a second transient voltage suppressor having a first end and a second end, wherein the first end of the second transient voltage suppressor is coupled to the positive power terminal; and
  a second high-voltage capacitor coupled between the second end of the second transient voltage suppressor and a ground terminal.

12. A Power over Ethernet Powered Device circuit applicable on a Powered Device, comprising:
  a control unit having a positive power terminal and a negative power terminal;
  a direct current voltage transforming circuit coupled to the control unit, wherein an output voltage is adjusted based on a pulse width modulation signal outputted by the control unit; and
  a protection circuit of electrostatic discharge which comprises:
    a transient voltage suppressor having a first end and a second end, wherein the first end of the transient voltage suppressor is coupled to the positive power terminal; and
    a high-voltage capacitor coupled between the second end of the transient voltage suppressor and a ground terminal.

13. The Power over Ethernet Powered Device circuit according to claim 12, wherein a capacitance of the high-voltage capacitor is greater than a component capacitance of the transient voltage suppressor.

* * * * *